United States Patent
Murofushi

(10) Patent No.: US 9,977,934 B2
(45) Date of Patent: May 22, 2018

(54) READING DEVICE AND CONTROL PROGRAM FOR READING DEVICE

(71) Applicant: TOSHIBA TEC KABUSHIKI KAISHA, Tokyo (JP)

(72) Inventor: Nobuo Murofushi, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/642,106

(22) Filed: Jul. 5, 2017

(65) Prior Publication Data

US 2018/0053022 A1    Feb. 22, 2018

(30) Foreign Application Priority Data

Aug. 19, 2016  (JP) ................................. 2016-161219

(51) Int. Cl.
G06K 7/10    (2006.01)

(52) U.S. Cl.
CPC ..... G06K 7/10316 (2013.01); G06K 7/10425 (2013.01)

(58) Field of Classification Search
CPC ........................ G07C 7/10316; G07C 7/10425
USPC ................................................ 340/10.1–10.4
See application file for complete search history.

(56) References Cited

U.S. PATENT DOCUMENTS

| 8,348,163 | B2* | 1/2013 | Oishi | H01Q 1/2208 235/439 |
| 2009/0058657 | A1* | 3/2009 | Tuttle | G06K 7/10316 340/572.7 |
| 2010/0245049 | A1* | 9/2010 | Yoshida | G06K 19/07749 340/10.1 |
| 2015/0261983 | A1* | 9/2015 | Ruotsalainen | H04B 5/0062 235/439 |
| 2015/0302708 | A1 | 10/2015 | Hattori | |

FOREIGN PATENT DOCUMENTS

| EP | 2808831 A1 | 12/2014 |
| JP | 2005-157919 | 6/2005 |

OTHER PUBLICATIONS

Extended European Search Report filed Jan. 17, 2018 in counterpart European Patent Application No. 17186859.9 (7 pages).

* cited by examiner

*Primary Examiner* — Allen T Cao
(74) *Attorney, Agent, or Firm* — Patterson & Sheridan, LLP

(57) ABSTRACT

A reading device includes an antenna having a signal radiating surface and configured to output a linearly polarized wave from the radiating surface, a movable and rotatable stage supporting the antenna and configured to move the antenna along a first direction parallel to the radiating surface of the antenna and rotate the antenna on an axis that is normal to the radiating surface of the antenna, and a tag reader connected to the antenna and configured to supply signals to the antenna for reading information from a wireless tag and to receive signals from the antenna including information read from the wireless tag.

20 Claims, 10 Drawing Sheets

ARROW A VIEW

READING DEVICE AND CONTROL PROGRAM FOR READING DEVICE

CROSS-REFERENCE TO RELATED APPLICATION

This application is based upon and claims the benefit of priority from Japanese Patent Application No. 2016-161219, filed Aug. 19, 2016, the entire contents of which are incorporated herein by reference.

FIELD

Embodiments described herein relate generally to a reading device and a control program for a reading device.

BACKGROUND

In the related art, merchandise and inventory are managed by attaching a Radio Frequency Identification (RFID) tag to the merchandise and the inventory. The RFID tags store information regarding the merchandise or the inventory and this stored information can be read from the tag using a reading device. The tag reading process can read a plurality of RFID tags at the same time, or substantially so, to improve the efficiency of the merchandise or inventory management process.

In a reading device which can read a plurality of RFID tags at once, it is also desirable to prevent failures in the reading of the RFID tags so as to improve efficiency of the reading process.

DETAILED DESCRIPTION

In general, according to one embodiment, a reading device includes an antenna having a signal radiating surface and configured to output a linearly polarized wave from the radiating surface, a movable and rotatable stage supporting the antenna and configured to move the antenna along a first direction parallel to the radiating surface of the antenna and rotate the antenna on an axis that is normal to the radiating surface of the antenna, and a tag reader connected to the antenna and configured to supply signals to the antenna for reading information from a wireless tag and to receive signals from the antenna including information read from the wireless tag.

Figure 1:
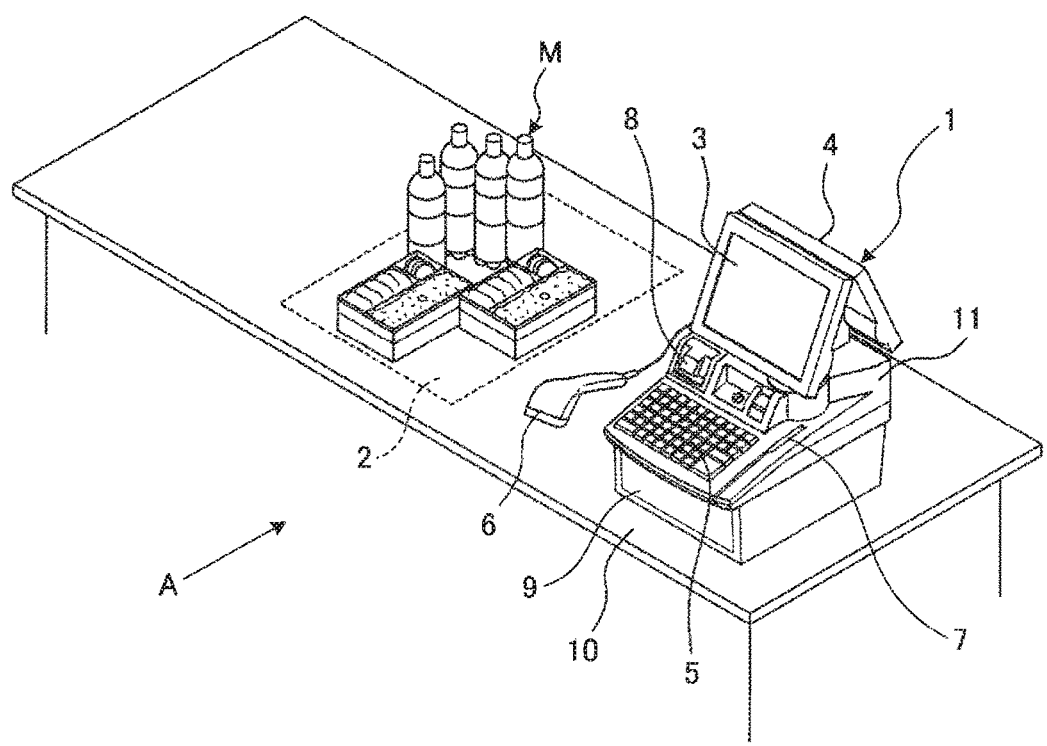
FIG. 1 is an exterior perspective view of a check-out counter in which a reading device according to an embodiment is installed.

Hereinafter, a reading device and a control program according to example embodiment will be described with reference to drawings. FIG. 1 is an exterior perspective view of a check-out counter 10 in which a reading device 2 is installed.

A point-of-sale (POS) terminal 1 is a merchandise sales data processing device (e.g., a cash register or the like) which is installed in a store such as a supermarket or the like and used for registration and settlement processing of merchandise being purchased by a customer. The reading device 2 reads information of an RFID tag that is attached to merchandise. The reading is performed in a non-contact manner using radio waves.

As illustrated in FIG. 1, the POS terminal 1 includes a main body 11, a salesperson side display 3, a customer side display 4, a keyboard 5, a bar-code reader 6, a card reader 7, a receipt printer 8, and a drawer 9. The POS terminal 1 is connected to the reading device 2. The main body 11 includes the salesperson side display 3, the customer side display 4, the keyboard 5, the bar-code reader 6, the card reader 7, the receipt printer 8, and the drawer 9.

The salesperson side display 3 is attached to an upper part of the main body 11 towards an inside (salesperson side) of the check-out counter 10. The salesperson side display 3 displays information such as a name, a price, or the like of the merchandise corresponding to a commodity code input into the POS terminal 1. The salesperson side display 3 may have a function of a touch panel capable of recognizing an instruction by a salesperson's pressing of keys or buttons. The customer side display 4 is attached to an outside (customer side) of the check-out counter 10 while facing a back surface to the salesperson side display 3. The keyboard 5 includes a key such as a closing key for declaring an end of sales registration processing of merchandise M being purchased by a customer.

The bar-code reader 6 reads information such as a merchandise code or the like from a bar-code that is attached to the merchandise M. The card reader 7 reads information of customer's points card (e.g., a customer loyalty card) or a credit card inserted in a card insertion slot (not specifically illustrated in FIG. 1). The receipt printer 8 prints a receipt after an accounting process and issues the receipt from a receipt issue opening (not specifically illustrated in FIG. 1). The drawer 9 includes a drawer capable of opening and closing and accommodates cash or the like in the drawer.

A controller 26 (see FIG. 8) housed inside the main body 11 is connected to a store controller, such as a server or the like, which has a merchandise database. The POS terminal 1 queries the store controller for information associated with a merchandise code read by the bar-code reader 6 or a merchandise code read by the reading device 2 and can thus obtain merchandise information such as a merchandise name, a merchandise image, and a merchandise unit price corresponding to the merchandise code. The POS terminal 1 performs sales registration processing of the merchandise using the merchandise information.

Next, a configuration of the reading device 2 and a reading process of a wireless tag will be described. In the present example, the wireless tag is an RFID tag operating in an UHF band.

Figure 2:
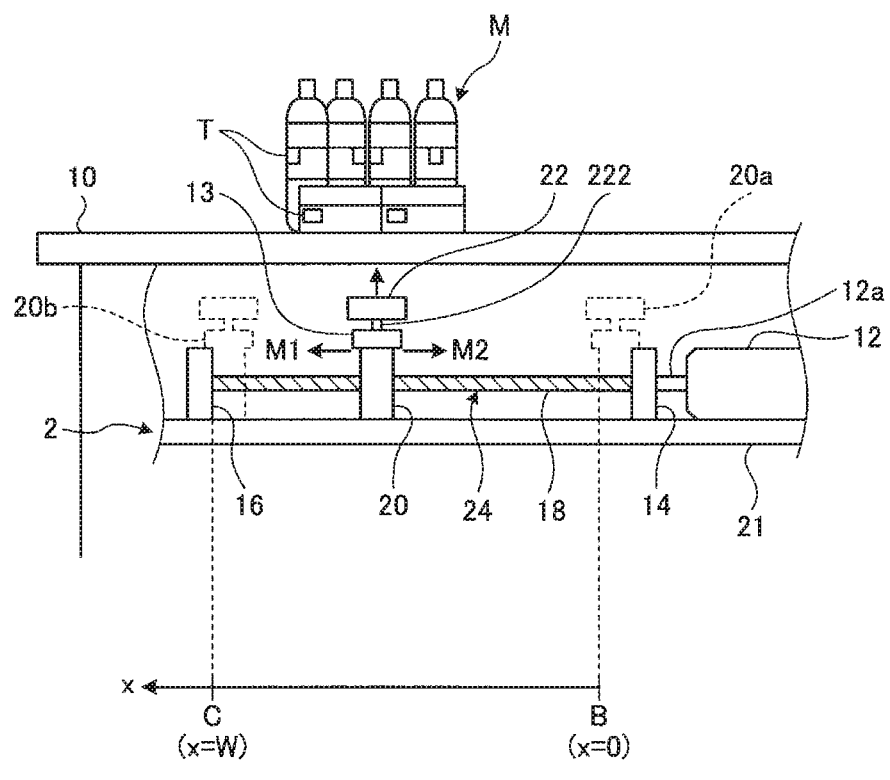
FIG. 2 is a schematic side view (viewed along the arrow A in FIG. 1) illustrating a configuration of a reading device.

FIG. 2 is a side view (viewed along the arrow A in FIG. 1) illustrating a schematic configuration of the reading device 2. As illustrated in FIG. 2, the reading device 2 can be installed inside the check-out counter 10. The reading device 2 may be embedded in the check-out counter 10 or may be placed in a drawer or on a shelf board, or the like of the check-out counter 10. By providing the reading device 2 inside the check-out counter 10 as described, it is possible to use a wider surface area on the check-out counter 10. That is, it is possible to improve comfort when a customer places merchandise on the upper surface of the counter 10 or when a salesperson performs a registration operation and a packing operation. A top board of the check-out counter 10 is made of a material through which radio waves penetrate and may be made of, for example, a wooden material.

As illustrated in FIGS. 1 and 2, the customer may directly place the merchandise M to be purchased on the top board of the check-out counter 10. Alternatively, the customer may place a shopping basket containing the merchandise M on the top board of the check-out counter 10.

An RFID tag T that is attached to the merchandise M stores unique identification information and other information such as a merchandise code or the like corresponding to the merchandise M to which the RFID tag T is attached. The reading device 2 reads tag information such as tag identification information, the merchandise code, and the like from the RFID tag T attached to the merchandise M and then transmits the read tag information to the POS terminal 1.

As illustrated in FIG. 2, the reading device 2 includes an RFID antenna 22 of a linearly polarized wave type. As indicated by the upward arrow in FIG. 2, the antenna 22 is provided so that a traveling direction of a linearly polarized RFID radio wave emitted from the antenna 22 is directed to the top board of the check-out counter 10.

In the reading device 2, the antenna 22 of RFID is attached to a rotation axis 222 of a stepping motor 13. The upward arrow in FIG. 2 is a traveling direction of a linearly polarized wave of RFID. The antenna 22 is rotatable about an axis parallel to the traveling direction of the linearly polarized wave. The stepping motor 13 is provided on a moving stage 20 horizontally (in a direction perpendicular to the traveling direction of the linearly polarized wave) moved by a moving mechanism 24. The antenna 22 on the stepping motor 13 reads the RFID tag while moving in the directions indicated by the arrows M1 and M2 in FIG. 2.

The reading device 2 changes a polarization direction of a linearly polarized RFID wave by rotating an antenna surface of the antenna 22. Accordingly, tag information can be read regardless of an orientation of the RFID tag T on the check-out counter 10 and failure to read the RFID tag can be prevented. That is, by adopting the rotatable antenna 22 of the linearly polarized wave type, a reading area with higher electric field intensity for RFID communication can be expanded as compared to an RFID antenna of a circularly polarized wave type. Therefore, information communication efficiency and reading accuracy are improved with antenna 22. Furthermore, due to the rotation of the antenna 22 around the traveling direction of a radio wave, reading of tag information can still be performed without failure to read RFID tags of various orientations with respect to the antenna in substantially the same manner as with a circularly polarized wave type antenna.

Next, a configuration example of a rotation mechanism of the antenna 22 will be described in more detail with reference to FIGS. 3 to 7.

Figure 3:
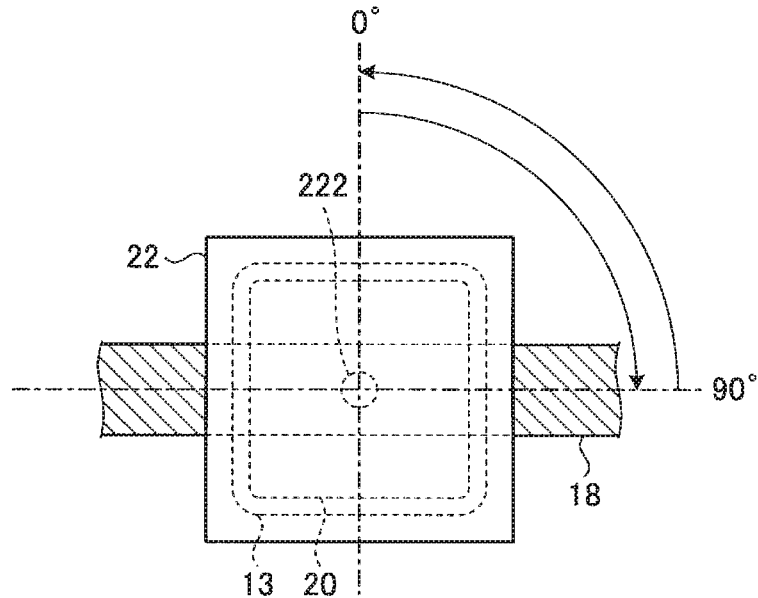
FIG. 3 is a schematic diagram illustrating a configuration of a rotation mechanism of an antenna.

FIG. 3 is a diagram illustrating a schematic configuration of the rotation mechanism of the antenna 22. As illustrated in FIGS. 2 and 3, the stepping motor 13 is attached to an upper surface of the moving stage 20. The antenna 22 is fixed to the rotation axis 222 of the stepping motor 13 and rotated in a clockwise direction or in a counterclockwise direction together with rotation of the rotation axis 222. The moving stage 20 has a through hole, and a screw shaft 18 is fitted in the through hole as illustrated in FIG. 2. This configuration will be described below in explanation of the moving mechanism 24.

Figure 4:
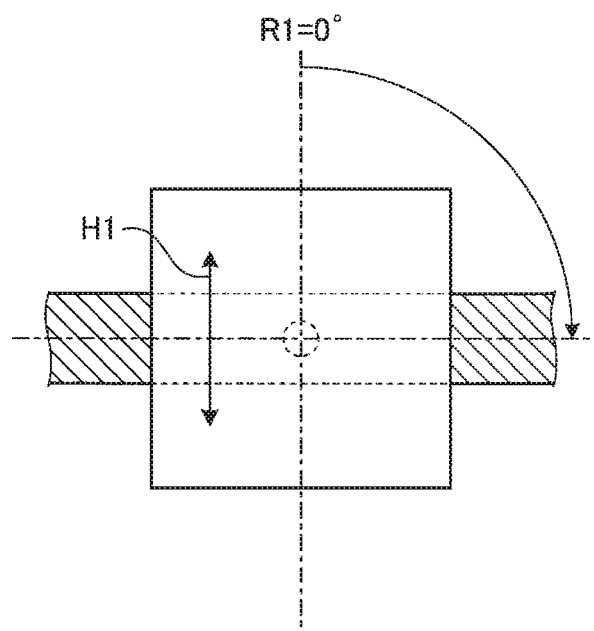
FIG. 4 is a diagram illustrating aspects of a rotation operation of an antenna.
Figure 5:
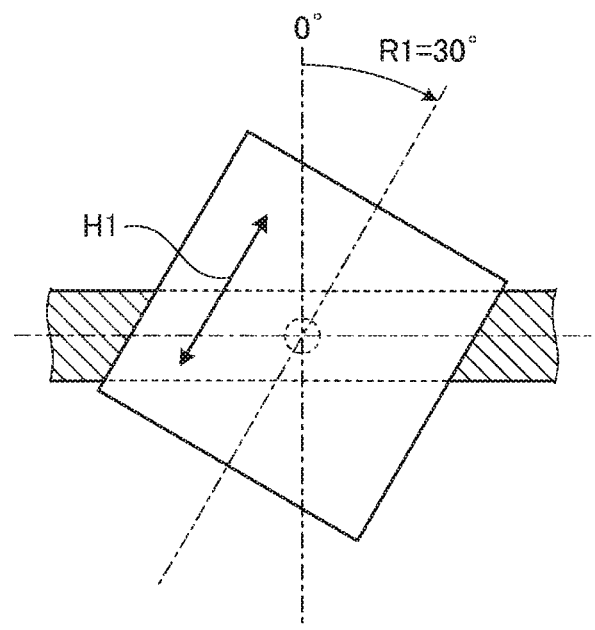
FIG. 5 is a diagram illustrating aspects of a rotation operation of an antenna.
Figure 6:
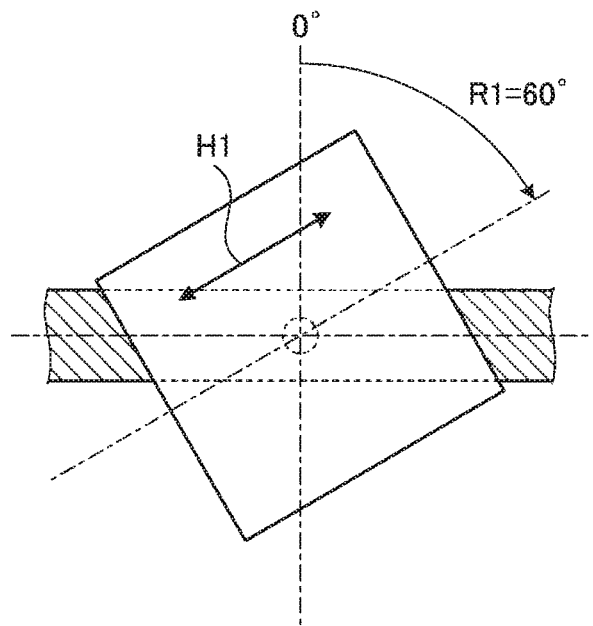
FIG. 6 is a diagram illustrating aspects of a rotation operation of an antenna.
Figure 7:
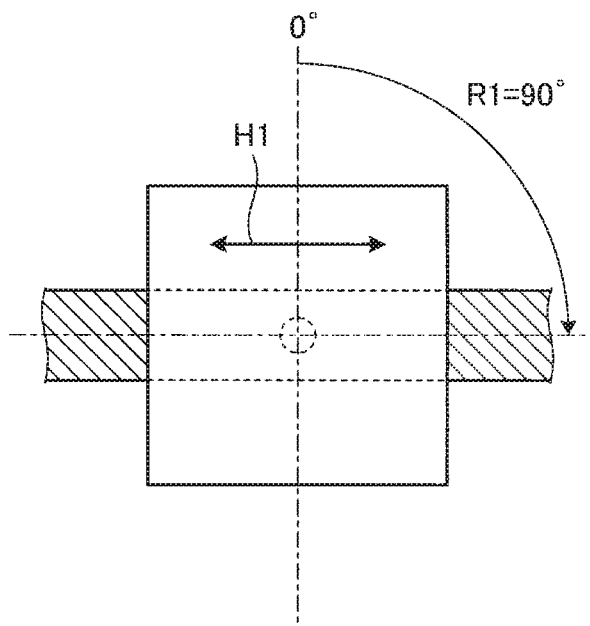
FIG. 7 is a diagram illustrating aspects of a rotation operation of an antenna.

FIGS. 4 to 7 are explanatory diagrams illustrating rotation operations of the antenna 22. FIG. 4 illustrates an initial state related to a rotation angle of the antenna 22. In this state, assuming that a rotation angle R1 is 0°, the antenna 22 is subsequently rotated in a clockwise direction, the rotation angle R1 is 30° as illustrated in FIG. 5, the rotation angle R1 is 60° as illustrated in FIG. 6, and then the rotation angle R1 becomes 90° as illustrated in FIG. 7. When the antenna 22 is rotated in this way, a polarization direction H1 of a linearly polarized wave is also rotated together with the rotation angle R1 of the antenna 22.

Accordingly, it is possible to read information of RFID tags by changing the polarization direction H1 of the RFID radio wave. Thus in a case of communicating with an RFID tag attached to merchandise placed casually on the check-out counter 10 and thus an RFID tag placed with arbitrary orientation, it is possible to prevent drops in the reading of the tags. By rotating the antenna 22 with the rotation angle R1 set to 0° to 90°, it is possible to read RFID tags in any orientation of in-plane directions parallel to the antenna surface.

Although it is also possible to read the RFID tags in arbitrary orientations by providing an RFID antenna of a circularly polarized wave type, in general, an antenna of a linearly polarized wave type can have a wider reading area with higher electric field intensity. Thus it is possible to provide a larger effective reading area by adopting a rotatable antenna 22. According to the present embodiment, by rotating the antenna 22 of the linearly polarized wave type by the rotation mechanism, the reading device 2 combines advantages of the antenna of the linearly polarized wave type and advantages of the antenna of the circularly polarized wave type.

Next, a configuration example of the moving mechanism 24 of the antenna 22 will be described.

Returning to FIG. 2, the reading device 2 includes the moving mechanism 24 which allows the antenna 22 to move along the top board of the check-out counter 10. The moving mechanism 24 is a mechanism for moving the antenna 22 in parallel with the antenna surface. The moving mechanism 24 includes a linear motion mechanism having the screw shaft 18, a bearing 16 of the screw shaft 18, a stepping motor 12, a coupling 14, and the moving stage 20. The stepping motor 12 is a rotational power source. The coupling 14 transmits rotational power of the stepping motor 12 to the screw shaft 18. The moving stage 20 is integrally configured with a ball screw nut screwed to the screw shaft 18.

One end of the screw shaft 18 is horizontally supported by the bearing 16 and the other end of the screw shaft 18 is horizontally supported by the coupling 14. The screw shaft 18 so installed is thus axially-rotatable. In addition, an output shaft 12a of the stepping motor 12 is connected with the other end of the screw shaft 18 in the coupling 14. With this configuration, rotation power of the stepping motor 12 is transmitted from the output shaft 12a to the screw shaft 18 via the coupling 14.

The moving stage 20 has a through hole and the ball screw nut of the screw shaft 18 is embedded in the through hole. The moving stage 20 moves forward and backward along the screw shaft 18 together with rotation of the screw shaft 18, that is, moves in the directions of the arrow M1 and the arrow M2 in FIG. 2. Since a metallic ball (e.g., steel ball) is interposed in a threaded unit between the screw shaft 18 and the ball screw nut, the moving stage 20 can be moved smoothly. The moving stage 20 is linearly moved along an x-axis as illustrated in FIG. 2 within a range from a point B (x=0) as a first position to a point C (x=W) as a second position. That is, the moving stage 20 is moved between a rightmost position 20a and a leftmost position 20b.

In this manner, the moving mechanism 24 changes a rotational motion of the stepping motor 12 to a linear motion by a mechanism of the ball screw described above, so that the moving stage 20 can move forward and backward. The moving stage 20 is moved while keeping a part of the moving stage 20 in contact with a supporting plate 21. The moving stage 20 so installed is not to rotate as the screw shaft 18 rotates. Accordingly, the moving stage 20 is moved without rotating.

On an upper surface of the moving stage 20, the antenna 22 is fixed so that a reading surface of the antenna 22 is facing the top board of the check-out counter 10. The reading surface of the antenna 22 refers to a radiation surface from which a planar patch antenna emits a radio wave. According to this disposition, the antenna 22 emits a radio wave towards the reading surface, that is, toward the top board of the check-out counter 10. Then, the antenna 22 is moved along the screw shaft 18 integrally with the moving stage 20.

With the configuration of the moving mechanism 24 described above, when the stepping motor 12 is rotated in a normal direction, the moving stage 20 moves on the screw shaft 18 in a direction of the arrow M2 in FIG. 2. In addition, when the stepping motor 12 is rotated in a reverse direction, the moving stage 20 moves on the screw shaft 18 in a direction of the arrow M1 in FIG. 2. Along with a movement of the moving stage 20, the antenna 22 integrally moves with the moving stage 20 so that a reading surface of the antenna 22 is facing upward (in a direction of the top board of the check-out counter 10). With this movement, the antenna 22 communicates with the RFID tag T while changing a range of communication with the RFID tag T.

Figure 8:
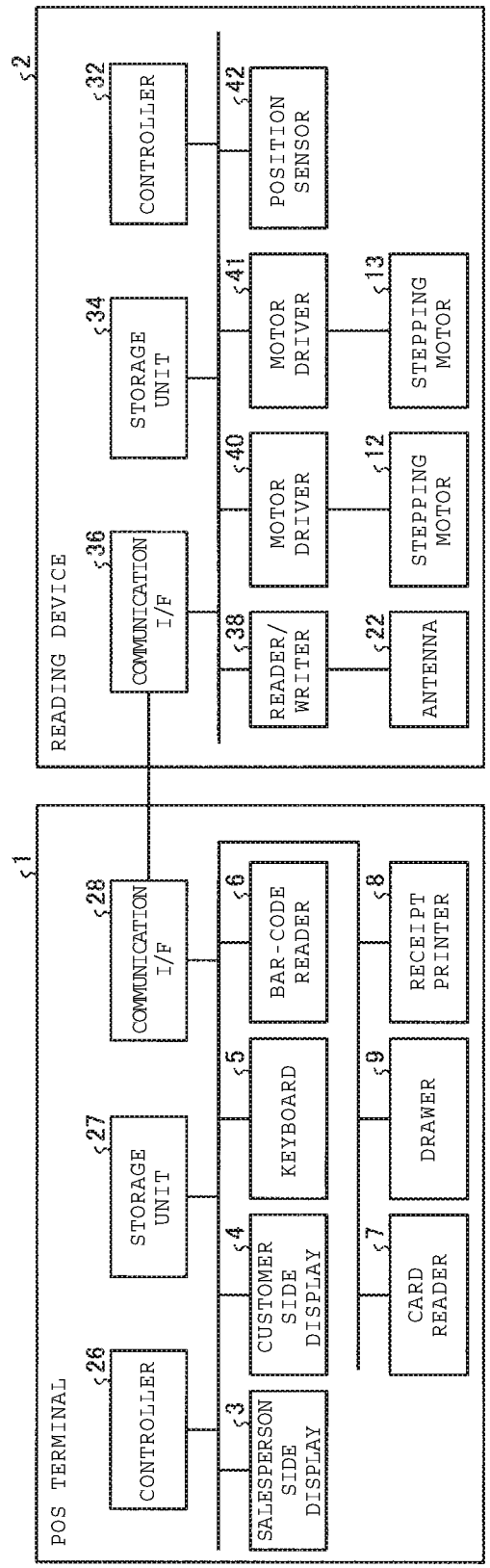
FIG. 8 is a block diagram illustrating hardware aspects of a point-of-sale (POS) terminal and a reading device.

Next, aspects of hardware configuration of the POS terminal 1 and the reading device 2 will be described. FIG. 8 is a block diagram illustrating hardware aspects of the POS terminal 1 and the reading device 2.

The POS terminal 1 includes the controller 26 having a Central Processing Unit (CPU), a Read Only Memory (ROM), a Random Access Memory (RAM), and the like. ROM stores various programs executed by CPU and various types of data. RAM temporarily stores data or programs when CPU executes various programs.

The salesperson side display 3, the customer side display 4, the keyboard 5, the bar-code reader 6, the card reader 7, the drawer 9, and the receipt printer 8 are connected to the controller 26 via various input/output (I/O) circuits (not specifically illustrated). In addition, a storage unit 27 and a communication I/F 28 are connected to the controller 26 via various input/output circuits.

The storage unit 27 is a storage device including a nonvolatile storage medium, such as a Hard Disk Drive (HDD) or a Solid State Drive (SSD). The storage unit 27 stores various programs or various types of data related to an operation of the POS terminal 1. As data stored in the storage unit 27, there is, for example, a merchandise master list in which merchandise information related to each piece of merchandise has been registered in association with a merchandise code for identifying the merchandise. Relevant merchandise information includes, for example, a merchandise name, a price, and the like of the corresponding merchandise. The communication I/F 28 is an interface for performing transmission and reception of various types of data to and from the reading device 2.

The reading device 2 includes a controller 32 having CPU, ROM, RAM, and the like. ROM stores various programs executed by CPU and various types of data. RAM temporarily stores data or programs when CPU executes various programs.

In addition, a storage unit 34, a communication I/F 36, a reader/writer 38, a motor driver 40, a motor driver 41, a position sensor 42, and the like are connected to the controller 32 via various input/output (I/O) circuits.

The reader/writer 38 and the antenna 22 can be connected with each other using a flexible coaxial cable. The reader/writer 38 communicates with the RFID tag T and performs transmission and reception of data through the antenna 22 under the instruction from the controller 32. The reader/writer 38 can be referred to as a tag reader.

The storage unit 34 is a storage device including a nonvolatile storage medium such as HDD or SSD. The storage unit 34 stores various programs or various types of data related to an operation of the reading device 2. The communication I/F 36 is an interface for performing transmission and reception of various types of data to and from the POS terminal 1.

The motor driver 40 is a driver circuit for operating the stepping motor 12. The motor driver 40 outputs a pulse signal for rotating the stepping motor 12 by a predetermined angle based on an instruction of the controller 32.

The motor driver 41 is a driver circuit for operating the stepping motor 13. The motor driver 41 outputs a pulse signal for rotating the stepping motor 13 by a predetermined angle based on an instruction of the controller 32.

The position sensor 42 is a sensor for improving positioning accuracy of the moving stage 20 and for example, a micro switch, a proximity sensor, or the like can be used. The position sensor 42 detects that the moving stage 20 is at the point B (e.g., a start position) in FIG. 2 or at the point C (e.g., an end position) in FIG. 2.

Figure 9:
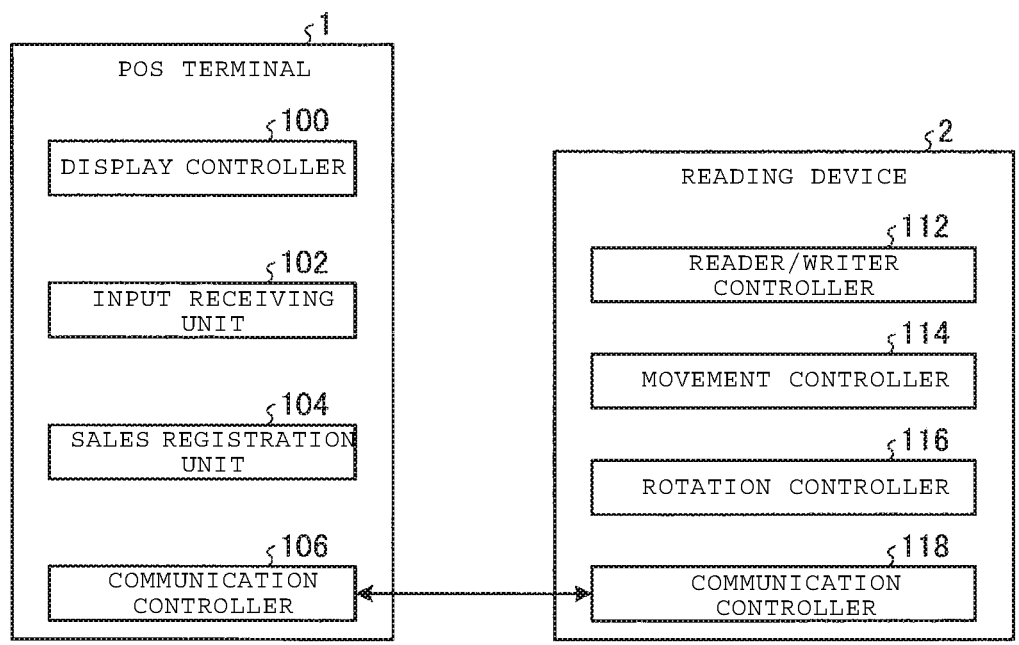
FIG. 9 is a block diagram illustrating functional aspects of a POS terminal and a reading device.

Next, functional aspects of the POS terminal 1 and the reading device 2 will be described. FIG. 9 is a block diagram illustrating the functional aspects of the POS terminal 1 and the reading device 2.

CPU of the controller 26 of the POS terminal 1 functions as a display controller 100, an input receiving unit 102, a sales registration unit 104, and a communication controller 106 by executing programs saved in the storage unit 27.

The display controller 100 controls the salesperson side display 3 and displays various screens on the salesperson side display 3. For example, the display controller 100 generates a screen having a button, an icon, or the like (hereinafter, referred to as "reading start button") for instructing the start of the reading the merchandise code or a button, an icon, or the like (hereinafter, referred to as "reading end button") for instructing the end of the reading. In addition, based on a merchandise code transmitted from the reading device 2, the display controller 100 reads merchandise information corresponding to the merchandise code from a merchandise master list and carries out a process to display a merchandise name, a price, tendered amount, change due amount, and the like of the merchandise M on the salesperson side display 3. Furthermore, the display controller 100 controls the customer side display 4 and displays various screens on the customer side display 4. For example, based on a merchandise code transmitted from the reading device 2, the display controller 100 carries out a process to display a merchandise name, a price, and the like of the merchandise M being purchased by a customer on both the salesperson side display 3 and the customer side display 4.

The input receiving unit 102 receives an input via the keyboard 5 or a touch panel. For example, when the button or key is pressed on an operation screen displayed on the salesperson side display 3, the input receiving unit 102 outputs instruction information corresponding to the pressed button or key to the controller 26.

When the payment is confirmed upon settlement with respect to each piece of merchandise corresponding to a merchandise code transmitted from the reading device 2, the sales registration unit 104 performs sales registration the merchandise being purchased by a customer. Specifically, the sales registration unit 104 registers the merchandise code of each piece of merchandise together with a tendered amount, change due, transaction date and time in a database for registration. The database for registration may be included in the storage unit 27 of the POS terminal 1 or in an external device capable of communicating with the POS terminal 1.

The communication controller 106 transmits and receives various types of information to and from the reading device 2 via the communication I/F 28. For example, if the reading start button is pressed, the communication controller 106 transmits instruction information for instructing a reading start to the reading device 2. In addition, the communication controller 106 receives a merchandise code transmitted from the reading device 2. In addition, if the reading end button is pressed, the communication controller 106 transmits instruction information for instructing a reading end to the reading device 2.

The controller 32 (CPU) of the reading device 2 functions as a reader/writer controller 112, a movement controller 114, a rotation controller 116, and a communication controller 118 by cooperating with a program saved in the storage unit 34.

The reader/writer controller 112 performs a reading from the RFID tag attached to merchandise and writing to the RFID tag via the antenna 22 by controlling the reader/writer 38 (see FIG. 8).

Specifically, if the start of the reading has been instructed from the POS terminal 1, the reader/writer controller 112 starts reading of the RFID tag. The reader/writer controller 112 reads tag information saved in the RFID tag by receiving a reflected wave of a radio wave emitted from the antenna 22. The reader/writer controller 112 transmits the tag information read from the RFID tag to the POS terminal 1 at any time during or after the reading.

In addition, if the end of the reading has been instructed from the POS terminal 1, the reader/writer controller 112 ends the reading by the reader/writer 38. If the end of the registration has been instructed from the POS terminal 1, the reader/writer controller 112 controls the reader/writer 38 and writes a registration end flag to the RFID tag. Here, it is assumed that the registration end flag is information indicating an end of sales registration for the particular RFID tag and is written to a predetermined storage area of each RFID tag.

The movement controller 114 controls an operation of the stepping motor 12 via the motor driver 40 and controls a movement of the moving stage 20, that is, a movement of the antenna 22. More specifically, the movement controller 114 controls the stepping motor 12 to rotate in a direction by a predetermined number of pulses to move the moving stage 20 from the point B to the point C in FIG. 2. The predetermined number of pulses may appropriately be set according to a pitch or the like of a screw formed on the stepping motor 12 and the screw shaft 18. In addition, the movement controller 114 controls the stepping motor 12 to rotate in a reverse direction to move the moving stage 20 from the point C to the point B in FIG. 2.

In addition, the movement controller 114 monitors an output of the position sensor 42 and detects that the moving stage 20 reaches the point B or the point C. For example, when the moving stage 20 is reciprocated between the point B and the point C, if the position sensor 42 detects that the moving stage 20 reaches the point B, the movement controller 114 switches a rotation direction of the stepping motor 12 from a normal direction to a reverse direction. The movement controller 114 controls movement of the moving stage 20 from the point C to the point B. For two reciprocating cycles, this operation is repeated twice. Other examples of a movement pattern will be described below with a flowchart.

In addition, if the end of the reading has been instructed from the POS terminal 1, the movement controller 114 controls movement of the moving stage 20 to the point B, which is a home position.

The rotation controller 116 controls an operation of the stepping motor 13 via the motor driver 41 and rotates the antenna 22 in a clockwise direction or in a counterclockwise direction. More specifically, the rotation controller 116 outputs a rotation angle and a rotation direction of the antenna 22 to the motor driver 41, and the motor driver 41 rotates and moves the stepping motor 13 by the number of steps in accordance with the rotation angle.

In addition, the rotation controller 116 controls the rotation and movement of the antenna 22 at a predetermined timing by cooperating with the movement controller 114. As an example of a timing of rotation, for example, the rotation controller 116 performs a rotation operation of the antenna 22 when the antenna 22 reaches the point B or the point C. As another example of a timing of rotation, for example, the rotation controller 116 performs a rotation operation of the antenna 22 while the antenna 22 is moved from the point B to the point C.

In addition, if the end of the reading has been instructed from the POS terminal 1, the rotation controller 116 returns the rotation angle R1 (see FIG. 3) of the antenna 22 to 0°, which is an initial state, and ends the rotation operation. A timing at which the rotation angle is 0° may be set while the antenna 22 is moved to the point B, which is the home position, or after a movement of the antenna 22 to the point B has been completed.

The communication controller 118 transmits and receives various types of information to and from the POS terminal 1 via the communication I/F 36. For example, the communication controller 118 receives instruction information for instructing a reading start received from the POS terminal 1. In addition, the communication controller 118 receives instruction information for instructing a reading end received from the POS terminal 1. In addition, the communication controller 118 transmits a merchandise code read from the RFID tag by the reader/writer controller 112 to the POS terminal 1. In this manner, the reader/writer controller 112 and the communication controller 118 function as an information output unit which reads information from the RFID tag via the antenna 22 and outputs the information.

Figure 10:
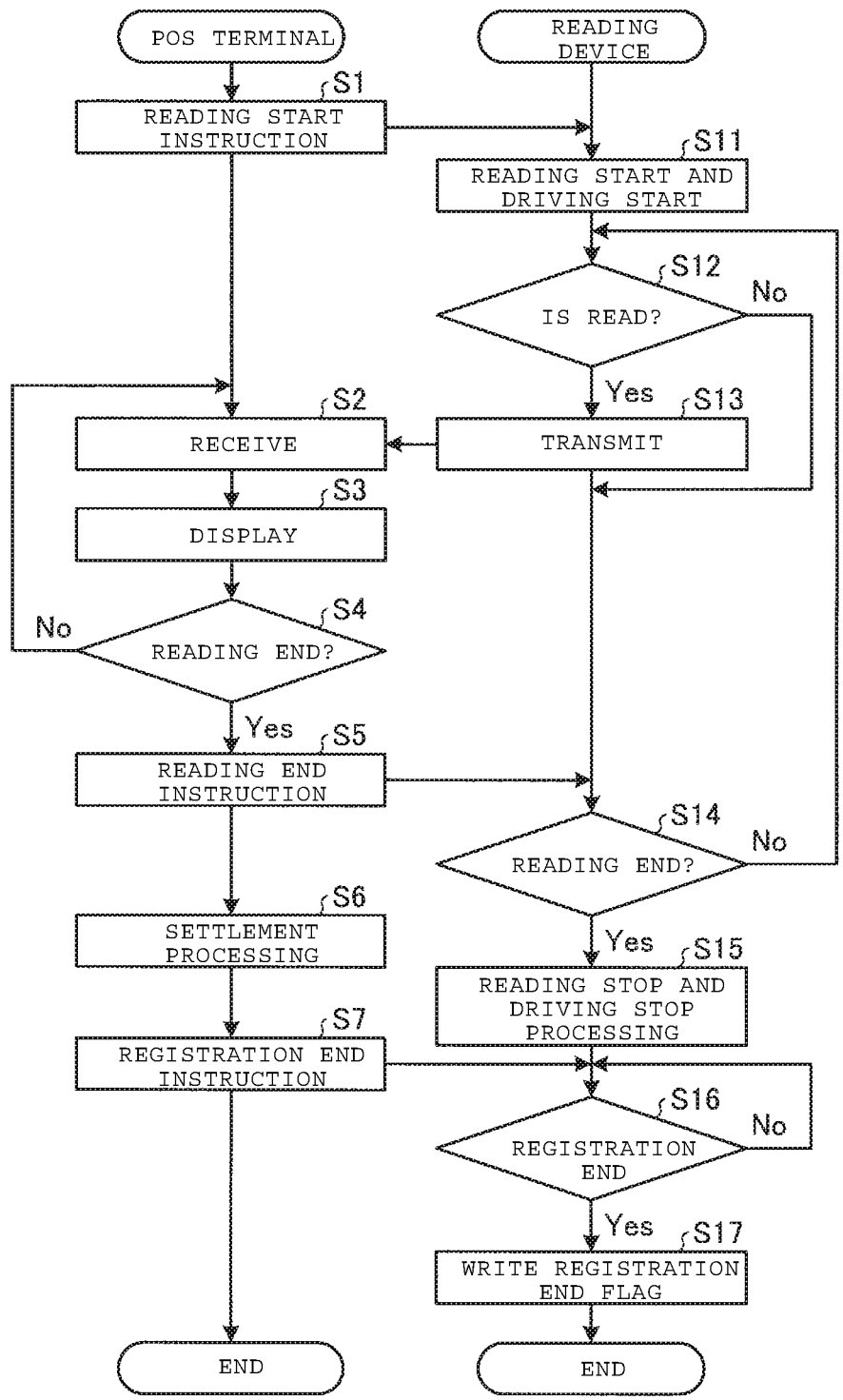
FIG. 10 is a flowchart illustrating an example of a reading process for reading information from an RFID tag performed by a POS terminal and a reading device according to an embodiment.

Next, a procedural example of an information reading process performed by the POS terminal 1 and the reading device 2 will be described. FIG. 10 is a flowchart illustrating a procedural example of a reading process for reading information from the RFID tag performed by the POS terminal 1 and the reading device 2.

A salesperson presses a button or key for instructing a reading start in the keyboard 5 of the POS terminal 1. The reading start may be instructed from the button or key displayed on the salesperson side display 3 including a touch panel function instead of the keyboard 5. The input receiving unit 102 of the POS terminal 1 receives a reading start instruction of the RFID tag by receiving the pressed button or key (step S1).

The reader/writer controller 112 of the reading device 2 instructs a reading start to the reader/writer 38 and starts a reading process of the RFID tag (step S11). The movement controller 114 starts reciprocating movement control of the antenna 22 and the rotation controller 116 starts rotation driving control of the antenna 22 at a beginning of the reading process (step S11). A procedural example of reciprocating movement control and rotation driving control will be described below with reference to FIG. 11 and the following Figs.

If the reader/writer controller 112 reads tag information from the RFID tag (Yes in step S12), the communication controller 118 transmits the read tag information to the POS terminal 1 at any time during or after the reading (step S13). If tag information is not read (No in step S12), the reading process is continued together with a movement operation and a rotation operation of the moving stage 20 and the process is moved to step S14.

If tag information is received from the reading device (step S2), the communication controller 106 of the POS terminal 1 reads merchandise information corresponding to a merchandise code included in the tag information from a merchandise master list. The display controller 100 carries out a process to display the merchandise information that has been read on the salesperson side display 3 and the customer side display 4 (step S3).

The display controller 100 determines whether or not the newly read tag information overlaps with the tag information that has already been read based on tag identification information and displays a reading result to avoid displaying inadvertently repeated reading results. Overlapping information may be excluded on the POS terminal 1 side. Alternatively, a reading result may be transmitted to the POS terminal 1 only after excluding the overlapping information on the reading device 2 side.

When a salesperson determines that reading of the RFID tags for all of merchandise has been completed and merchandise information is correctly displayed on the salesperson side display 3, the salesperson presses the reading end button. If the input receiving unit 102 receives the instruction of the reading end button being pressed (Yes in step S4), the communication controller 106 transmits instruction information for instructing a reading end to the reading device 2 (step S5). While the reading end button is not pressed (No in step S4), the process returns to step S2.

In the reading device 2, if the communication controller 118 receives instruction information for instructing a reading end (Yes in step S14), the reader/writer controller 112 stops the reading process of the RFID tags (step S15). In addition, the movement controller 114 stops reciprocating movement control of the antenna 22 and the rotation controller 116 stops rotation driving control of the antenna 22 (step S15). That is, the movement controller 114 stops a movement of the moving stage 20, returns the moving stage 20 to the point B, which is the home position, and stops driving of the stepping motor 12. In addition, the rotation controller 116 stops rotational driving of the antenna 22, sets the rotation angle R1 of the antenna 22 to 0°, and stops driving of the stepping motor 13.

If the instruction information for instructing a reading end is not yet received (No in step S14), the process returns to step S12.

The sales registration unit 104 of the POS terminal 1 performs settlement processing by calculating a deposit, a change due amount, and the like according to a selection operation of a transaction end key or the like (step S6). If the settlement processing is ended, the sales registration unit 104 registers the merchandise to a journal or the like for record keeping and the communication controller 106 transmits instruction information for instructing a registration end to the reading device 2 (step S7) and ends the process.

In the reading device 2, if the communication controller 118 receives instruction information for instructing a registration end (Yes in step S16), the reader/writer controller 112 controls the reader/writer 38, writes a registration end flag to all of the RFID tag (step S17), and stops the processing. While the instruction information is not received (No in step S16), the process waits to receive the instruction information.

As described above, the antenna 22 is moved and rotated during the reading process. However, the antenna 22 may be moved and rotated during a process of writing a registration end flag (step S17). In this manner, it is possible to improve efficiency of the writing process.

Next, a specific example of reciprocating movement control and rotation driving control started in step S11 in FIG. 10.

Figure 11:
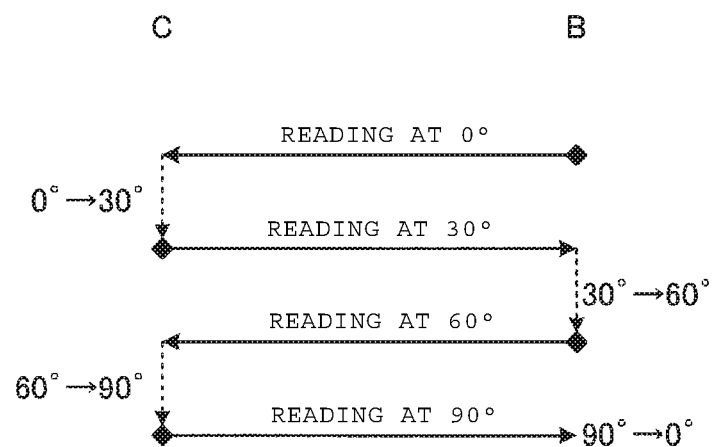
FIG. 11 is a diagram illustrating a rotation operational example of an antenna.

FIG. 11 is an explanatory diagram illustrating an example of reciprocating movement control and rotation driving control. As illustrated in FIG. 11, the rotation controller 116 may control rotation of the antenna 22 by 30° each time the antenna 22 is moved to an end portion of one section turned back at the end portion of the section. That is, when the antenna 22 is turned back at the point C after a forward movement from the point B to the point C, or when the antenna 22 is turned back at the point B after a backward movement from the point C to the point B, the rotation controller 116 may control rotation of the antenna 22 in a clockwise direction by 30° and then end the reading after a total of two reciprocating cycles. In this manner, it is possible to rotate a polarization direction of the antenna 22 by a total of 90° and read tags in all directions of an in-plane direction of the check-out counter 10 by rotating the antenna 22 from 0° to 90°. In addition, it is possible to efficiently change a radio wave communication situation by combining linear motion and a rotation operation.

Figure 12:
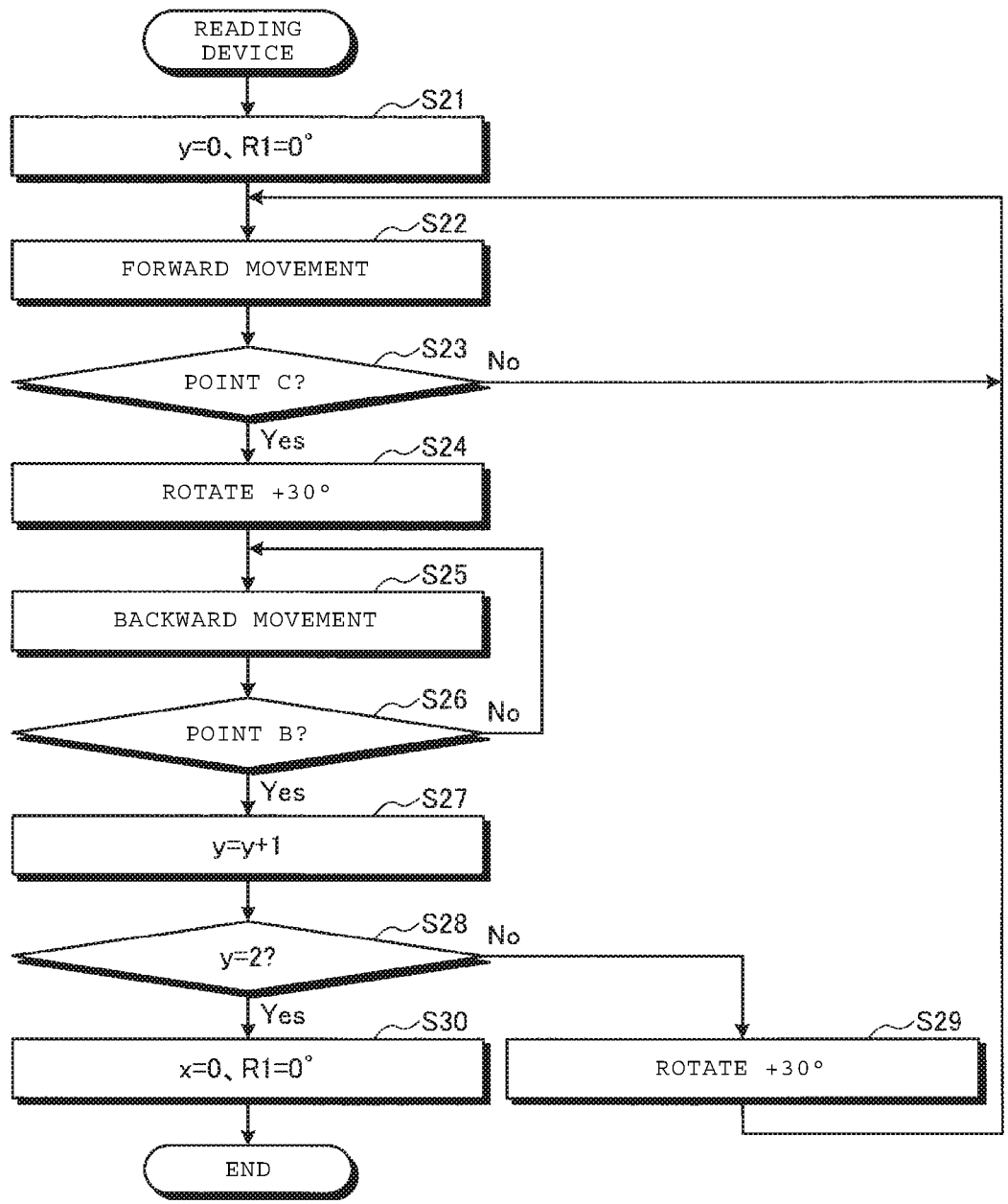
FIG. 12 is a flowchart illustrating an example of a reading process in which tag information is read while rotating an antenna by 30°.

Next, a procedure example when the reading device 2 performs control illustrated in FIG. 11 will be described with reference to FIG. 12. FIG. 12 is a flowchart illustrating an example in a case of rotating the antenna 22 each time a movement of one segment is ended.

If driving control is started in step S11 in FIG. 10, the movement controller 114 sets a count value y for counting the number of reciprocating cycles of the antenna 22 to y=0

(step S21). In a case where the rotation angle R1 of the antenna 22 is not 0°, the rotation controller 116 drives and controls the stepping motor 13 to set the rotation angle R1 to 0° as an initial state. In addition, if the position sensor 42 at the point B does not detect the moving stage 20, the movement controller 114 drives and controls the stepping motor 12 to move the moving stage 20 to the point B at which x=0.

The movement controller 114 controls rotation of the stepping motor 12 in a forward direction to start movement of the moving stage 20 in a first direction (step S22). The movement controller 114 monitors an output of the position sensor 42 and determines whether or not a forward movement has ended and the moving stage 20 has reached the point C (step S23). Until the position sensor 42 at the point C detects the moving stage 20 (No in step S23), the stepping motor 12 is continuously rotated in the forward direction and the moving stage 20 is continuously moved in the first direction.

When the position sensor 42 at the point C detects the moving stage 20 and the moving stage 20 reaches the point C (Yes in step S23), the movement controller 114 temporarily stops the stepping motor 12. In addition, the rotation controller 116 controls rotation of the stepping motor 13 by +30° to set the rotation angle R1 to 30° (step S24). After then, the movement controller 114 starts rotation of the stepping motor 12 in a reverse direction and starts a backward movement of the moving stage 20, that is, a movement from the point C to the point B (step S25). In a case of No in step S23, the movement controller 114 continues to drive the stepping motor 12 until the position sensor 42 detects the moving stage 20 (step S22).

Next, if the position sensor 42 at the point B detects the moving stage 20 and the moving stage 20 reaches the point B (Yes in step S26), the movement controller 114 temporarily stops the stepping motor 12. The movement controller 114 increases the count value y for counting the number of reciprocating cycles by 1 (step S27) and determines whether or not the count value y equals 2 (step S28).

In a case where the count value y is not 2 after first reciprocating cycle is ended (No in step S28), the rotation controller 116 controls rotation of the stepping motor 13 by +30° to set the rotation angle R1 to 60° (step S29). After step S29, the process is returned to step S22.

That is, if the count value y is 1, the movement controller 114 controls movement of the antenna 22 to the point C in a state where the rotation angle R1 is 60° (step S22). When the antenna 22 reaches the point C (Yes in step S23), the rotation controller 116 controls rotation of the stepping motor 13 by +30° to set the rotation angle R1 to 90° (step S24). The movement controller 114 then starts a backward movement of the antenna 22 from the point C to the point B (step S25). When the antenna 22 reaches the point B (Yes in step S26), the movement controller 114 temporarily stops rotation of the stepping motor 12 and increases the count value y by 1 (step S27). If the count value y now equals 2 (Yes in step S28), rotation control from 0° to 90° is ended and movement control for two reciprocating cycle is ended.

Therefore, the movement controller 114 stops driving of the stepping motor 12 after checking that the moving stage 20 is stopped at the point B (at which x=0). In addition, the rotation controller 116 controls rotation of the stepping motor 13 in a by 90° to return the rotation angle R1 to 0°, and then stops driving the stepping motor 13 and ends the processing (step S30).

As described above with reference to FIG. 10, when receiving a reading end instruction from the POS terminal 1 (Yes in step S14), the movement controller 114 and the rotation controller 116 stop driving control. The moving stage 20 is returned to the point B, which is the home position, and the rotation angle R1 is returned to 0°.

As described above (and as depicted in FIG. 12), the antenna 22 is rotated when the moving stage 20 returns to the point B or is at the point C. However, a timing of rotation is not limited thereto. For example, the antenna 22 may be rotated during a forward movement and/or during a backward movement.

Figure 13:
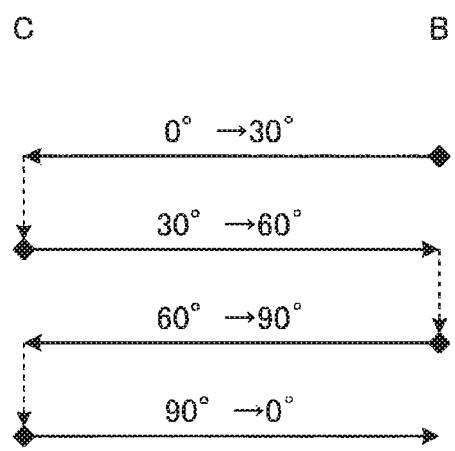
FIG. 13 is a diagram illustrating a rotation operational example of the antenna in which a rotation operation is performed during a movement operation.

FIG. 13 is an explanatory diagram illustrating a rotation operation example of the antenna 22 in a case where a rotation operation is performed during a movement operation. As illustrated in FIG. 13, the rotation controller 116 may control rotation of the antenna 22 while the antenna 22 is moving from the point B to the point C or while the antenna 22 is moving from the point C to the point B. The example in FIG. 13 illustrates an example in which the antenna 22 is rotated in a clockwise direction in increments 30°. In this case, the antenna 22 is rotated from 0° to 90° in 1.5 reciprocations between point B and point C. Accordingly, it is possible to rotate the antenna 22 up to 90° in a shorter time than the example illustrated in FIG. 11 and it is possible to more efficiently read information from the RFID tag.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example the reading device 2 in the above embodiments has been applied to a case where information saved in the RFID tag T attached to the merchandise M is being read. However, the reading device 2 can also be used as an RFID tag writing device for writing information to the RFID tags T. That is, the antenna 22 may also record merchandise registrations by writing predetermined information to the RFID tag T. This writing to the tags may be conducted in conjunction with the reading of the tags. The information written to the RFID tag T can be used not only as information indicating that the merchandise has been registered but also as information for security purposes.

In addition, in the above description, an operation example in which the antenna 22 is rotated while being reciprocated is described. However, a moving method is not limited to the above example. For example, the antenna 22 may be rotated from 0° to 90° while moving one-way from the point B to the point C. In addition, in the above description, an operation example in which the antenna 22 is moved only in a uni-axial direction (e.g., along x-axis) is described. However, it is also possible to linearly move the antenna 22 in a y-axis direction (orthogonal to the x-axis) and also in a bi-axial direction of both the x-axis and y-axis. In addition, in the above description, the configuration in which the antenna 22 linearly moves in the x-axis direction is described. However, the antenna 22 may be configured to move along a curved path.

A program executed by each of the devices according to the embodiment describe above can be provided in advance in a storage medium (ROM or storage unit). However, the program is not limited thereto. The program may be configured to be recorded and provided in a computer-readable recording medium such as a CD-ROM, a flexible disk (FD), a CD-R, a Digital Versatile Disk (DVD), or the like as a file in installable format or executable format. Furthermore, the storage medium may be an embedded system within the computer. However, the storage medium may also be a storage medium from which a program is transmitted via a LAN, the Internet, or the like to be downloaded and stored or temporarily stored in another device for execution.

In addition, the program executed by each of the devices according to the embodiments describe above may be saved on a computer connected to a network such as the Internet and provided by downloading the program via a network, and the program may be provided and distributed via a network such as the Internet.

As described above, according to the present disclosure, the antenna 22 is rotated around a traveling direction of a linearly polarized wave and also moved in parallel with the antenna surface. Accordingly, it is possible to widen a reading area that has high electric field intensity and thus improve information communication efficiency and reading accuracy while taking an advantage of the linearly polarized wave output. It is thus possible to read information from tags oriented in any direction of an in-plane direction of the antenna surface by linearly polarized waves in substantially the same manner as circularly polarized waves. That is, according to the present disclosure, it is possible to prevent failed readings of the arbitrarily oriented RFID tags and to improve efficiency of the reading process.

What is claimed is:

1. A reading device, comprising:
   an antenna having a signal radiating surface and configured to output a linearly polarized wave from the radiating surface;
   a movable and rotatable stage supporting the antenna and configured to move the antenna along a first direction parallel to the radiating surface of the antenna, and to rotate the antenna on an axis that is normal to the radiating surface of the antenna; and
   a tag reader connected to the antenna and configured to supply signals to the antenna for reading information from a wireless tag and to receive signals from the antenna including information read from the wireless tag.

2. The reading device according to claim 1, wherein
   the stages moves the antenna from a first position to a second position and from the second position to the first position, rotates the antenna by a predetermined amount when the antenna is at the second position after being moved from the first position, and rotates the antenna by the predetermined amount when the antenna is at the first position after being moved from the second position, and
   the tag reader supplies signals to the antenna for reading information from the wireless tag while the antenna is traversing between the first and second positions.

3. The reading device according to claim 2, wherein the predetermined amount is 30°.

4. The reading device according to claim 1, wherein
   the stage moves the antenna from a first position to a second position and from the second position to the first position, rotates the antenna by a predetermined amount while the antenna traversing from the first position to second position, and rotates the antenna by the predetermined amount while the antenna traversing from the second position to the first position, and
   the tag reader supplies signals to the antenna for reading information from the wireless tag while the antenna is traversing between the first and second positions.

5. The reading device according to claim 4, wherein the predetermined amount is 30°.

6. The reading device according to claim 1, wherein the antenna is a planar patch antenna.

7. The reading device according to claim 1, wherein the wireless tag is an RFID tag.

8. A tag reading apparatus, comprising:
   an antenna having a signal radiating surface and configured to output a linearly polarized signal in a first direction normal to a radiating surface;
   a tag reader connected to the antenna and configured to supply signals to the antenna for reading information from a wireless tag and to output the information read from the wireless tag;
   a linear movement mechanism configured to move the antenna along a second direction perpendicular to the first direction; and
   a rotational movement mechanism configured to rotate the antenna about an axis parallel to the first direction.

9. The tag reading apparatus according to claim 8, further comprising a controller configured to:
   cause the linear movement mechanism to move the antenna along the second direction between a first position and a second position during a tag reading process, and
   cause the rotational movement mechanism to rotate the antenna about the axis by a predetermined amount during the tag reading process.

10. The tag reading apparatus according to claim 9, wherein the controller causes the rotational movement mechanism to rotate the antenna about the axis by the predetermined amount when the antenna is at the second position during the tag reading process.

11. The tag reading apparatus according to claim 9, wherein the controller causes the rotational movement mechanism to rotate the antenna about the axis by the predetermined amount while the linear movement mechanism is moving the antenna along the second direction between the first position and the second position during the tag reading process.

12. The tag reading apparatus according to claim 9, wherein the controller causes the rotational movement mechanism to rotate a total of 90° about the axis from an initial position during the tag reading process.

13. The tag reading apparatus according to claim 9, wherein the predetermined amount is 30°.

14. The tag reading apparatus according to claim 8, further comprising:
   a countertop having a portion that is transparent to a radio wave emitted by the antenna during a tag reading process, the portion being disposed above the antenna in the first direction.

15. The tag reading apparatus according to claim 8, wherein the wireless tag is an RFID tag.

16. The reading device according to claim 8, wherein the antenna is a planar patch antenna.

17. A non-transitory computer readable medium storing program instructions that when executed by a wireless tag reading device causes:
   an antenna having a signal radiating surface to output a linearly polarized wave from the radiating surface;
   a movable and rotatable stage supporting the antenna to move the antenna along a first direction parallel to the radiating surface of the antenna, and rotate the antenna on an axis that is normal to the radiating surface of the antenna; and
   a tag reader connected to the antenna, to supply signals to the antenna for reading information from a wireless tag and to receive signals from the antenna including information read from the wireless tag.

18. The non-transitory computer readable medium according to claim 17, wherein the program instructions when executed further cause:
- the stage to move the antenna from a first position to a second position and from the second position to the first position, to rotate the antenna by a predetermined amount when the antenna is at the second position after being moved from the first position, and rotate the antenna by the predetermined amount when the antenna is at the first position after being moved from the second position, and
- the tag reader to supply the signals to the antenna for reading information from the wireless tag while the antenna is traversing between the first and second positions.

19. The non-transitory computer readable medium according to claim 18, wherein the program instructions when executed further cause:
- the stage to move the antenna from a first position to a second position and from the second position to the first position, to rotate the antenna by a predetermined amount while the antenna traversing from the first position to second position, and rotate the antenna by the predetermined amount while the antenna traversing from the second position to the first position, and
- the tag reader to supply signals to the antenna for reading information from the wireless tag while the antenna is traversing between the first and second positions.

20. The non-transitory computer readable medium according claim 17, wherein the antenna is a planar patch antenna.

* * * * *